United States Patent
Deng et al.

(10) Patent No.: US 12,412,883 B2
(45) Date of Patent: Sep. 9, 2025

(54) EXTRUSION HEAD FOR MOLDING POLE PIECE AND MOLDING DEVICE COMPRISING SAME, AND MOLDING METHOD AND PREPARATION METHOD THEREFOR

(71) Applicant: EVE ENERGY CO., LTD., Guangdong (CN)

(72) Inventors: Huihui Deng, Guangdong (CN); Lang Cao, Guangdong (CN); Peiling Sun, Guangdong (CN); Pingao Wang, Guangdong (CN); Jun Zhang, Guangdong (CN); Yuan Zhu, Guangdong (CN); Jianhua Liu, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 98 days.

(21) Appl. No.: 18/014,093

(22) PCT Filed: Oct. 16, 2020

(86) PCT No.: PCT/CN2020/121456
§ 371 (c)(1),
(2) Date: Dec. 30, 2022

(87) PCT Pub. No.: WO2022/056983
PCT Pub. Date: Mar. 24, 2022

(65) Prior Publication Data
US 2023/0268479 A1 Aug. 24, 2023

(30) Foreign Application Priority Data

Sep. 15, 2020 (CN) .......................... 202010969643.2
Sep. 15, 2020 (CN) .......................... 202022014548.5

(51) Int. Cl.
*H01M 4/04* (2006.01)

(52) U.S. Cl.
CPC ....... *H01M 4/0433* (2013.01); *H01M 4/0471* (2013.01)

(58) Field of Classification Search
CPC ................................. B29C 48/00; H01M 4/00
(Continued)

(56) References Cited

U.S. PATENT DOCUMENTS 5,316,556 A    5/1994   Morris
5,698,235 A * 12/1997   Satoh ..................... B29C 48/65
                                                 366/89

(Continued)

FOREIGN PATENT DOCUMENTS

CN        1802246 A    7/2006
CN    102484243 A    5/2012
(Continued)

OTHER PUBLICATIONS https://davis-standard.com/custom_blog/basic-extruder-control-functionality-part-1 (Year: 2025).*

(Continued)

*Primary Examiner* — Alison L Hindenlang
*Assistant Examiner* — Debjani Roy
(74) *Attorney, Agent, or Firm* — HUNTON ANDREWS KURTH LLP

(57) ABSTRACT

An extrusion head (1) for molding a pole piece and a molding device comprising same, and a molding method and a preparation method therefor. The extrusion head (1) comprises an extrusion head (1) housing, and a through extrusion channel (6) is provided inside the extrusion head (1) housing in an extrusion direction; and the extrusion channel (6) is divided into a transition cavity (61) and a molding cavity (62) that are in sequential butt joint and (Continued)

communication in the extrusion direction, and the diameter of the annular surface of the inner wall of the transition cavity (61) is gradually reduced in the extrusion direction.

9 Claims, 1 Drawing Sheet

(58) Field of Classification Search
USPC .................................................. 264/211.21
See application file for complete search history.

(56) References Cited

U.S. PATENT DOCUMENTS

| | | | |
|---|---|---|---|
| 5,725,822 A * | 3/1998 | Keller | B29C 48/022 |
| | | | 264/211.11 |
| 6,939,383 B2 | 9/2005 | Eastin et al. | |
| 2002/0062740 A1 * | 5/2002 | Brukov | B01D 39/2065 |
| | | | 425/467 |
| 2002/0130434 A1 * | 9/2002 | Rigali | B28B 1/42 |
| | | | 502/527.16 |
| 2019/0198854 A1 * | 6/2019 | Sumiya | H01M 4/587 |
| 2019/0262879 A1 * | 8/2019 | Ben Amor | B21C 25/08 |

FOREIGN PATENT DOCUMENTS

| | | |
|---|---|---|
| CN | 105144324 A | 12/2015 |
| CN | 104201381 B | 9/2018 |
| CN | 109351793 A | 2/2019 |
| CN | 110407300 A | 11/2019 |
| CN | 110690450 A | 1/2020 |
| CN | 110993888 A | 4/2020 |
| CN | 212625651 U | 2/2021 |
| JP | 05242880 A | 9/1993 |
| WO | 95019052 A1 | 7/1995 |

OTHER PUBLICATIONS

International Search Report dated Mar. 30, 2021 issued in PCT/CN2020/121456.

First Office Action dated issued on May 20, 2024 for CN 202010969643.2.

Extended European Search Report dated Jun. 6, 2024 for EP 20953840.4.

* cited by examiner

EXTRUSION HEAD FOR MOLDING POLE PIECE AND MOLDING DEVICE COMPRISING SAME, AND MOLDING METHOD AND PREPARATION METHOD THEREFOR

TECHNICAL FIELD

The present application belongs to the technical field of electrode sheet preparation, and relates to an extrusion head for electrode sheet molding, a molding device comprising the same, and a molding method and a preparation method therefor, and for example, an extrusion head for special-shaped electrode sheet molding, a molding device comprising the same, and a molding method and a preparation method therefor.

BACKGROUND

With the rapid development of the Internet of Things construction, the concept of smart city is now well established. The application modes of batteries tend to be diversified, and more and more designs and products are developed based on batteries with special shapes, which are used for intelligent monitoring, intelligent metering, intelligent tracking, intelligent wear and medical devices. The special-shaped batteries can show regular or irregular geometric shapes, including coin batteries, square batteries, hexagonal batteries, triangular batteries, sector batteries, etc. At the same time, the carbon positive electrode structure used by special-shaped batteries is different from that of the common cylindrical cells, which requires battery electrode sheets with different specifications and shapes.

For example, square batteries use rectangular carbon sheets with a thickness of 1-3 mm, coin batteries use round or circular carbon sheets with a diameter of 3-30 mm and a thickness of 1-4 mm, and sector batteries require carbon sheets with a certain radian, diameter and thickness. Those carbon sheets have two common requirements. The first is that the thickness requirement of the electrode sheet is extremely high. If the thickness of the electrode sheet exceeds the standard, the side film will be crushed in the assembly process, resulting in short circuit, and the housing will swell in the long-term high-temperature discharge process. If the thickness of the electrode sheet is lower than the standard, the assembled positive electrode, side film and lithium belt will have a bad contact, showing poor current collecting effect. The second is that the cross section of the positive electrode carbon sheet needs to be flat and burr-free, and has certain strength, which is conducive to the assembly process of the electrode sheet.

At present, there are mainly two molding methods for carbon sheets.

The first molding method is stamping molding, and that is, the positive electrode material, conductive agent, binder, etc. are mixed first, prepared into positive electrode particles with a diameter of 2-4 nm, spread in a mold, and directly pressed and molded by pressure.

For example, CN104201381B, a preparation method for lithium ion batteries includes the following steps. A positive electrode sheet and a negative electrode sheet are prepared separately: a binder, a conductive agent powder, and a positive electrode active powder or a negative electrode active powder are uniformly mixed and stirred, heated to 80-200° C., and placed into a prefabricated mold having a metal mesh placed inside, the powders in the mold are subjected to a pressure of 3-20 MPa for molding, and a positive electrode molded body and a negative electrode molded body are obtained separately; an end of the metal mesh is provided with a conductive tab extending out of the side of the positive or negative electrode molded body; the positive and negative electrode molded bodies are immersed into a ceramic solution, and after drying, the positive and negative electrode molded bodies are coated with a ceramic layer on the surface; then, the positive and negative electrode molded bodies are immersed in a polymer solution, and after drying, the positive and negative electrode molded bodies are coated with a polymer layer on the surface, so the a positive electrode sheet and a negative electrode sheet are obtained.

There are some structural defects in the electrode sheets prepared by this stamping molding process, the reason of which is that the positive electrode particles are squeezed together solely through physical interaction after the molding, and the positive electrode sheet has a low strength. There is a certain risk that the positive electrode sheet will break up when the positive electrode sheet is removed from the mold, or the material is moved, or the positive electrode sheet is assembled, or the current collector is installed, which is not conducive to the automatic assembly. In addition, if the positive electrode is unevenly spread out in the mold before pressing, the molded positive electrode sheet will have uneven thickness, or even cannot be molded.

The second molding method is roller pressing molding, which includes the steps: a positive electrode material, a conductive agent, a binder, etc. are mixed uniformly first, and then the mixed materials are immersed in an ethanol solution after drying. After absorbing the ethanol solution, the positive electrode shows a certain strength due to the existence of binder, and then roller-pressed into an electrode sheet with a certain thickness, dried, and then subjected to a stamping and cutting equipment, to obtain positive electrode sheets with different shapes.

For example, CN110407300A discloses a preparation method for a porous carbon-mixed-carbon black roller-pressed electrode material, which includes the following steps: (1) a mixed system consisting of porous carbon, carbon black, polytetrafluoroethylene and ethanol is uniformly dispersed by ultrasound to obtain a mixed system A, in which a porous carbon mass, a carbon black mass and an ethanol volume have a ratio of (4-12) mg:(10-30) mg:(1-3) ml, and the mixed system A is stirred until it is sticky to obtain a preliminarily modified catalytic layer of the roller-pressed electrode material; a mixed system consisting of carbon black, polytetrafluoroethylene and ethanol is uniformly dispersed by ultrasound to obtain a mixed system B, the mixed system B is stirred to be sticky to obtain a preliminarily modified diffusion layer of the roller-pressed electrode material; (2) the preliminarily modified catalytic layer of the roller-pressed electrode material and the preliminarily modified diffusion layer of the roller-pressed electrode material are roller-pressed onto a metal mesh on the upper surface and the lower surface, respectively, to obtain a preliminarily modified roller-pressed electrode material; (3) the preliminarily modified roller-pressed electrode material is annealed, then cooled to room temperature to obtain the porous carbon-mixed-carbon black roller-pressed electrode material.

The disadvantage of this molding method is that a large amount of organic solvent ethanol is used as the positive electrode molding agent in the process, and the low flash point of ethanol poses certain safety risks in the operation and drying process. In addition, the positive electrode after absorbing ethanol is wet and soft, so the thickness uniformity of the positive electrode after roller pressing in a roller press is difficult to guarantee, and the rapid volatilization of ethanol easily leads to powder dropping and hollowing of the positive electrode.

Therefore, the molding device and molding process of the electrode sheet needs to be further studied to better improve the thickness uniformity of the electrode sheet, improve the product quality and reduce the powder drop rate.

SUMMARY

The present application is to provide an extrusion head for electrode sheet molding, a molding device comprising the same, a molding method and a preparation method thereof, which is suitable for the extrusion molding of electrode sheets, especially for the extrusion molding of special-shaped electrode sheets. The mixed electrode sheet mixture is extruded into an electrode sheet with a certain thickness by a screw, and after drying, the electrode sheets of special batteries with different models can be manufactured directly through specific cutting dies. Compared with other preparation methods of electrode sheets, this method has obviously improved production efficiency, and meanwhile, the obtained electrode sheet has uniform thickness, low powder drop rate and obviously improved electrode sheet quality.

To achieve the object, the present application adopts the technical solutions below.

In a first aspect, the present application provides an extrusion head for electrode sheet molding, which includes an extrusion head housing, wherein the extrusion head housing is internally provided with a through extrusion channel along the extrusion direction.

The extrusion channel is divided into a transition cavity and a molding cavity which are joined and communicated in sequence along the extrusion direction, and an inner wall annular surface of the transition cavity has a gradually reduced diameter along the extrusion direction.

The present application provides an extrusion head, which is suitable for the extrusion molding of electrode sheets, especially for the extrusion molding of special-shaped electrode sheets. The transition cavity with a gradually reduced diameter can effectively improve the thickness uniformity of the electrode sheet and reduce the powder drop rate of the electrode sheet, and has a certain shaping effect on the extruded electrode sheet at the same time. It should be noted that a shape of the transition cavity with a gradually reduced diameter is not specifically limited, and for example, it can be a tapered inclined surface, a tapered curved surface, or a tapered zigzag shape. Additionally, the molding cavity can be designed into different cross section shapes according to the requirements, so as to obtain special-shaped electrode sheets with different cross section shapes. The special-shaped electrode sheets provided by the present application have lower powder drop rate and more uniform inner stress than those obtained by conventional stamping molding or roller pressing molding methods. The cross section shape and cross section size of the electrode sheet can be freely adjusted only by changing the extrusion head. The electrode sheet is effectively ensured to have uniform shrinkage ratio during the drying process, so that the unfavorable situation of the electrode sheet dropping powder or even breaking will not occur due to the stress concentration.

As an optional technical solution of the present application, the extrusion head housing is divided into a tapered section and a straight section which are joined in sequence along the extrusion direction, a small end surface of the tapered section is joined to the straight section, the tapered section is internally provided with the transition cavity along the extrusion direction, and the straight section is internally provided with the molding cavity along the extrusion direction.

Optionally, a large end surface of the tapered section is provided with a flange, and an outer edge of the flange is circumferentially provided with at least two threaded holes.

Optionally, the outer edge of the flange plate is circumferentially provided with four threaded holes at equal intervals.

Optionally, the threaded holes are countersunk threaded holes.

As an optional technical solution of the present application, the inner wall annular surface of the transition cavity has a stepped structure with a gradually reduced diameter.

In the present application, the transition cavity with the stepped structure with a gradually reduced diameter can further improve the thickness uniformity of the electrode sheet and reduce the powder drop rate of the electrode sheet, and has a certain shaping effect on the extruded electrode sheet.

Optionally, the stepped structure of the transition cavity includes at least two horizontal step surfaces along the extrusion direction and at least two vertical step surfaces connected with the horizontal step surfaces along the radial direction.

It should be noted that the number of steps of the stepped structure has an influence on the thickness uniformity of the final extruded electrode sheet. The more the number of steps, the greater the force of the aggregation in the transition cavity, the smoother the prepared electrode sheet, and the better the thickness uniformity.

Optionally, the stepped structure of the transition cavity includes three horizontal step surfaces and three vertical step surfaces connected with the horizontal step surfaces.

Optionally, the last vertical step surface along the radial direction is joined to the molding cavity through an inclined surface.

As an optional technical solution of the present application, the molding cavity is a flat channel.

Optionally, a cross section of the molding cavity is in a rectangular, wavy, arc-shaped or continuous concave and convex rampart shape.

It should be noted that the cross section shape of the molding cavity is not specifically limited in the present application, and the molding cavities with different cross sections can be designed according to the molding requirements and use demand of the electrode sheet by those skilled in the art.

In a second aspect, the present application provides a molding device for an electrode sheet, which is a screw extruder, including an extrusion device housing and a screw coaxially arranged inside the extrusion device housing, in which an end of the extrusion device housing is detachably connected with the extrusion head according to the first aspect.

The molding device provided by the present application is mainly suitable for the molding process of the electrode sheet. The existing stamping press and roller press are replaced by the screw extruder, and the electrode sheet mixture is subjected to extrusion molding by the screw. When the electrode sheet mixture is extruded by the screw, it is kneaded thoroughly, and the active material, binder and solvent can be further mixed uniformly. The extruded electrode sheet keeps a relatively complete internal structure, showing a relatively high electrical conductivity. The electrode sheet is ensured to have uniform shrinkage ratio during the subsequent drying process, guaranteeing the thickness uniformity of the electrode sheet. At the same time, the electrode sheet has excellent liquid absorption capacity, and it can significantly reduce the discharge capacity difference at different discharge postures (standing up, standing upside down) on the basis of keeping a good discharge capacity. Additionally, the cross section shape and cross section size of the extruded electrode sheet can be freely adjusted through matching different extrusion head with different cross section shapes, thus satisfying the electrode sheet shape requirements of different special-shaped batteries.

After drying, with specific cutting dies, the special battery electrode sheets of different models can be prepared, which has a significantly improved production efficiency compared with other preparation method for the electrode sheet. The transition cavity with a gradually reduced diameter can further improve the thickness uniformity of the electrode sheet and reduce the powder drop rate of the electrode sheet, and has a certain shaping effect on the extruded electrode sheet. The molding cavity can be designed into different cross section shapes according to the requirements, so as to obtain special-shaped electrode sheets with different cross section shapes. The special-shaped electrode sheets prepared by the extrusion head of the present application have lower powder drop rate and more uniform inner stress than those obtained by conventional stamping molding or roller pressing molding methods. The cross section shape and cross section size of the electrode sheet can be freely adjusted only by changing the extrusion head. The electrode sheet is effectively ensured to have uniform shrinkage ratio during the drying process, so that the unfavorable situation of the electrode sheet dropping powder or even breaking will not occur due to the stress concentration. The electrode sheet formed by this molding method requires no conductive substrate for supporting, but it can keep certain flexibility and strength. In the process of battery assembly, the carbon sheet can be automatically picked up and assembled by the equipment, and no fine powder will fall on separators during the current collector installation, reducing the micro-short-circuit risk caused by the fine powder of the electrode sheet.

The mixed electrode sheet mixture is extruded into an electrode sheet with a certain thickness by a screw, and after drying, the electrode sheets of special batteries with different models can be manufactured directly through specific cutting dies. Compared with other preparation methods of electrode sheets, this method has obviously improved production efficiency. This method has the specific advantages below.

(1) The thickness and width of the electrode sheet can be controlled by adjusting the extrusion head cross section size of the extrusion device, and the prepared electrode sheet shows excellent thickness uniformity and is suitable for most special battery electrode sheets.

(2) The electrode sheet formed by this preparation method requires no conductive substrate for supporting, but it can keep certain flexibility and strength. In the process of battery assembly, the carbon sheet can be automatically picked up and assembled by the equipment, and no fine powder will fall on separators during the current collector installation, reducing the micro-short-circuit risk caused by the fine powder of the electrode sheet.

(3) When the electrode sheet mixture is extruded by the screw, it is kneaded thoroughly, and the active material, binder and solvent can be further mixed uniformly. The extruded electrode sheet keeps a relatively complete internal structure, showing a relatively high electrical conductivity. At the same time, the electrode sheet has excellent liquid absorption capacity, and it can significantly reduce the discharge capacity difference at different discharge postures (standing up, standing upside down) on the basis of keeping a good discharge capacity.

As an optional technical solution of the present application, an end of the extrusion device housing away from the extrusion head is provided with a feeding bin, and an electrode sheet mixture is fed into the extrusion device housing through the feeding bin, mixed and conveyed to the extrusion head by the screw, and subjected to extrusion molding by the extrusion head.

Optionally, an end of the screw close to the feeding bin is connected with a driving motor in a drive transmission way, and the driving motor is used for driving the screw to rotate.

Optionally, the extrusion device housing is detachably connected with the extrusion head through a flange.

In the third aspect, the present application provides a molding method for an electrode sheet, which adopts the molding device according to the second aspect to perform extrusion molding on an electrode sheet mixture, and the molding method includes the steps:

feeding the electrode sheet mixture into the extrusion device housing through the feeding bin, mixing the mixture uniformly and conveying the mixture to the extrusion head by the screw, and subjecting the mixture to extrusion molding by the extrusion head.

As an optional technical solution of the present application, the extrusion has a frequency of 30-50 Hz, such as 30 Hz, 32 Hz, 34 Hz, 36 Hz, 38 Hz, 40 Hz, 42 Hz, 44 Hz, 46 Hz, 48 Hz or 50 Hz. The frequency is not limited to the listed values, but other unlisted values in this numerical range are also applicable.

Optionally, the extrusion has a temperature of 30-60° C., such as 30° C., 32° C., 34° C., 36° C., 38° C., 40° C., 42° C., 44° C., 46° C., 48° C., 50° C., 52° C., 54° C., 56° C., 58° C. or 60° C. The temperature is not limited to the listed values, but other unlisted values in this numerical range are also applicable.

In a fourth aspect, the present application provides a preparation method for an electrode sheet. The preparation method includes the following steps:

mixing an active material, a binder and a solvent into an electrode sheet mixture, and subjecting the same to molding, drying and blanking to obtain the electrode sheet, in which the molding is realized by the molding method according to the third aspect.

The present application provides a simple, efficient and safe molding method for an electrode sheet. The mixed electrode sheet mixture is extruded into an electrode sheet with a certain thickness by a screw, and after drying, the special-shaped electrode sheets with different models can be manufactured directly through specific cutting dies. Compared with other preparation methods of electrode sheets, this method has obviously improved production efficiency. This method has the specific advantages below.

(1) The thickness and width of the electrode sheet can be controlled by adjusting the extrusion head cross section size of the extrusion device, and the prepared electrode sheet shows excellent thickness uniformity and is suitable for most special battery electrode sheets.

(2) The electrode sheet formed by this preparation method requires no conductive substrate for supporting, but it can keep certain flexibility and strength. In the process of battery assembly, the carbon sheet can be automatically picked up and assembled by the equipment, and no fine powder will fall on separators during the current collector installation, reducing the micro-short-circuit risk caused by the fine powder of the electrode sheet.

(3) When the electrode sheet mixture is extruded by the screw, it is kneaded thoroughly, and the active material, binder and solvent can be further mixed uniformly. The extruded electrode sheet keeps a relatively complete internal structure, showing a relatively high electrical conductivity. At the same time, the electrode sheet has excellent liquid absorption capacity, and it can significantly reduce the discharge capacity difference at different discharge postures (standing up, standing upside down) on the basis of keeping a good discharge capacity.

As an optional technical solution of the present application, the active material includes one or a combination of at least two of conductive carbon black, acetylene black, Ketjen black, carbon nanotubes, manganese dioxide, carbon fluoride or $FeS_2$, such as a combination of acetylene black and Ketjen black, a combination of Ketjen black and carbon nanotubes or a combination of acetylene black and carbon nanotubes. The combination is not limited to the listed combinations, and other unlisted combinations within this combination range are also applicable.

Optionally, the binder is a polytetrafluoroethylene emulsion.

Optionally, the polytetrafluoroethylene emulsion has a solid content of 50-60 wt %, such as 50 wt %, 51 wt %, 52 wt %, 53 wt %, 54 wt %, 55 wt %, 56 wt %, 57 wt %, 58 wt %, 59 wt % or 60 wt %. The solid content is not limited to the listed values, but other unlisted values in this numerical range are also applicable.

Optionally, the solvent is isopropanol or an aqueous solution of isopropanol.

Optionally, the active material, the binder and the solvent have a mass ratio of 1:(0.1-0.3):(3-6), such as 1:0.1:3, 1:0.1:4, 1:0.1:5, 1:0.1:6, 1:0.2:3, 1:0.2:4, 1:0.2:5, 1:0.2:6, 1:0.3:3, 1:0.3:4, 1:0.3:5 or 1:0.3:6. The mass ratio is not limited to the listed values, but other unlisted values in this numerical range are also applicable.

Optionally, the mixing is performed in a mixing device.

Optionally, the mixing has a stirring time of 5-10 min, such as 5 min, 6 min, 7 min, 8 min, 9 min or 10 min. The stirring time is not limited to the listed values, but other unlisted values in this numerical range are also applicable.

Optionally, the mixing device has a stirring paddle rotating speed of 100-300 r/min, such as 100 r/min, 120 r/min, 140 r/min, 160 r/min, 180 r/min, 200 r/min, 220 r/min, 240 r/min, 260 r/min, 280 r/min or 300 r/min. The rotating speed is not limited to the listed values, but other unlisted values in this numerical range are also applicable.

Optionally, the molding is performed in a molding device.

Optionally, the molding device has an extrusion frequency of 30-50 Hz, such as 30 Hz, 32 Hz, 34 Hz, 36 Hz, 38 Hz, 40 Hz, 42 Hz, 44 Hz, 46 Hz, 48 Hz or 50 Hz. The extrusion frequency is not limited to the listed values, but other unlisted values in this numerical range are also applicable.

Optionally, the molding device has an extrusion temperature of 30-60° C., such as 30° C., 32° C., 34° C., 36° C., 38° C., 40° C., 42° C., 44° C., 46° C., 48° C., 50° C., 52° C., 54° C., 56° C., 58° C. or 56° C. The extrusion temperature is not limited to the listed values, but other unlisted values in this numerical range are also applicable.

Optionally, the drying is performed in a blast oven.

Optionally, the drying has a temperature of 120-160° C., such as 120° C., 125° C., 130° C., 135° C., 140° C., 145° C., 150° C., 155° C. or 160° C. The temperature is not limited to the listed values, but other unlisted values in this numerical range are also applicable.

Optionally, the drying has a time of 5-10 h, such as 5.0 h, 5.5 h, 6.0 h, 6.5 h, 7.0 h, 7.5 h, 8.0 h, 8.5 h, 9.0 h, 9.5 h or 10.0 h. The time is not limited to the listed values, but other unlisted values in this numerical range are also applicable.

Optionally, the blanking is performed in an automatic cutting and stamping device.

Optionally, the electrode sheet after blanking has a thickness of 1-4 mm, such as 1.0 mm, 1.5 mm, 2.0 mm, 2.5 mm, 3.0 mm, 3.5 mm or 4.0 mm. The thickness is not limited to the listed values, but other unlisted values in this numerical range are also applicable.

Optionally, the electrode sheet after blanking has a width of 20-50 mm, such as 20 mm, 25 mm, 30 mm, 35 mm, 40 mm, 45 mm or 50 mm. The width is not limited to the listed values, but other unlisted values in this numerical range are also applicable.

The system refers to an equipment system, a device system or a production device.

Compared with the prior art, the present application has the following beneficial effects.

(1) The present application provides an extrusion head, which is especially suitable for the extrusion molding of electrode sheets. The transition cavity with a gradually reduced diameter can further improve the thickness uniformity of the electrode sheet and reduce the powder drop rate of the electrode sheet, and has a certain shaping effect on the extruded electrode sheet. Additionally, the molding cavity can be designed into different cross section shapes according to the requirements, so as to obtain special-shaped electrode sheets with different cross section shapes. The special-shaped electrode sheets prepared by the extrusion head of the present application have lower powder drop rate and more uniform inner stress than those obtained by conventional stamping molding or roller pressing molding methods. The cross section shape and cross section size of the electrode sheet can be freely adjusted only by changing the extrusion head. The electrode sheet is effectively ensured to have uniform shrinkage ratio during the drying process, so that the unfavorable situation of the electrode sheet dropping powder or even breaking will not occur due to the stress concentration.

(2) The electrode sheet prepared by the preparation method provided by the present application requires no conductive substrate for supporting, but it can keep certain flexibility and strength. In the process of battery assembly, the electrode sheet can be automatically picked up and assembled by the equipment, and no fine powder will fall on separators during the current collector installation, reducing the micro-short-circuit risk caused by the fine powder of the electrode sheet.

(3) When the electrode sheet mixture is extruded by the screw, it is kneaded thoroughly, and the active material, binder and solvent can be further mixed uniformly. The extruded electrode sheet keeps a relatively complete internal structure, showing a relatively high electrical conductivity. At the same time, the electrode sheet has excellent liquid absorption capacity, and it can significantly reduce the discharge capacity difference at different discharge postures (standing up, standing upside down) on the basis of keeping a good discharge capacity.

In the figures, 1—extrusion head; 2—extrusion device housing; 3—feeding bin; 4—screw; 5—threaded hole; 6—extrusion channel; 61—transition cavity; 62—molding cavity.

DETAILED DESCRIPTION

It should be understood that in the description of the present application, the terms "center", "lengthways", "crosswise", "over", "under", "front", "back", "left", "right", "vertical", "horizontal", "top", "bottom", "inside", "outside" and the like indicate an orientation or a positional relationship based on an orientation or a positional relationship shown in accompanying drawings, which is only used for describing the present application conveniently and simplifying the description, rather than indicating or implying that the device or unit referred to necessarily has a particular orientation or needs to be arranged and operated in a particular orientation, and thereby should not be construed as a limitation to the present application.

It should be noted that in the description of the present application, unless otherwise specified or defined particularly, the terms "arrange", "link" and "connect" should be understood in a broad sense; for example, there may be a fixed connection, a detachable connection, or an integral connection; there may be a mechanical connection or an electrical connection; and there may be a direct connection, an indirect connection through an intermediate medium, or an internal communication between two units. For those skilled in the art, specific meanings of the above terms in the present application can be understood through specific situations.

The technical solutions of the present application will be further described below with reference to the accompanying drawings and through embodiments.

Figure 1:
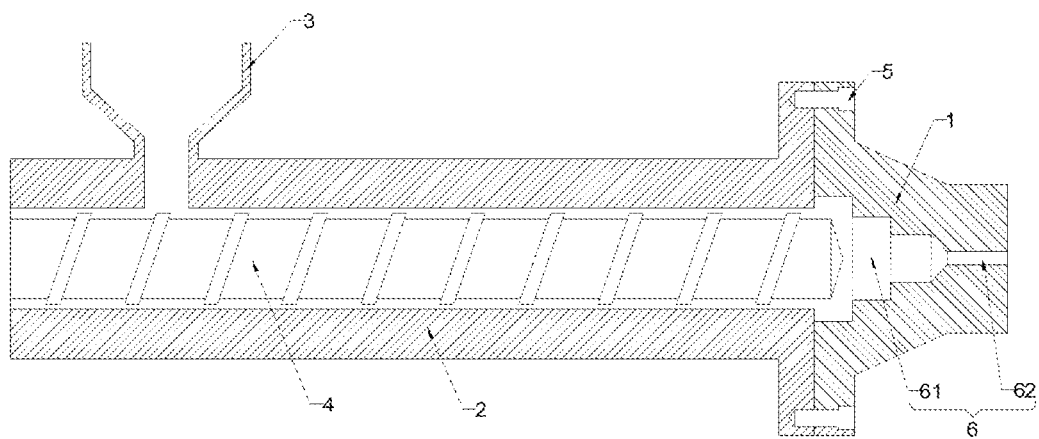
FIG. 1 is a structural schematic diagram of a molding device provided by an embodiment of the present application.
Figure 2:
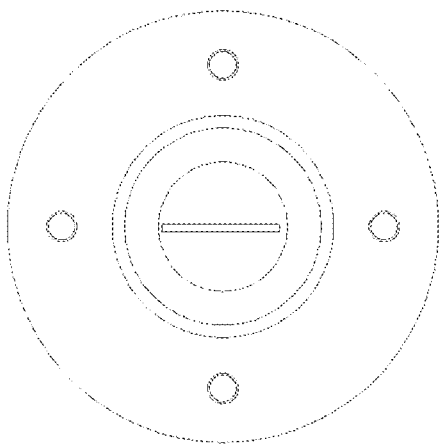
FIG. 2 is a side view of an extrusion head provided by an embodiment of the present application.
Figure 3:
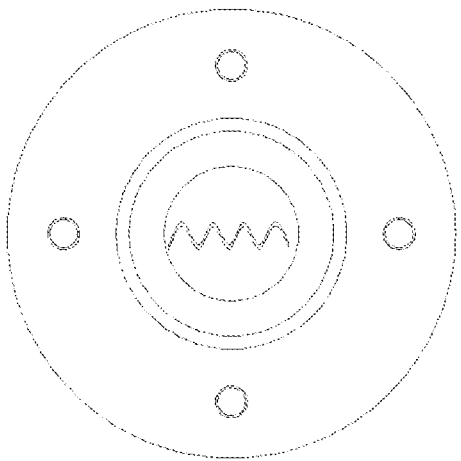
FIG. 3 is a side view of an extrusion head provided by an embodiment of the present application.

In an embodiment, the present application provides an extrusion head 1 for electrode sheet molding. As shown in FIG. 1, FIG. 2 and FIG. 3, the extrusion head 1 includes an extrusion head 1 housing, and the extrusion head 1 housing is internally provided with a through extrusion channel 6 along the extrusion direction. The extrusion channel 6 is divided into a transition cavity 61 and a molding cavity 62 which are joined and communicated in sequence along the extrusion direction, and an inner wall annular surface of the transition cavity 61 has a gradually reduced diameter along the extrusion direction. The transition cavity 61 with a gradually reduced diameter can further improve the thickness uniformity of the electrode sheet and reduce the powder drop rate of the electrode sheet, and has a certain shaping effect on the extruded electrode sheet. In the present application, a shape of the transition cavity 61 with a gradually reduced diameter is not specifically limited, and for example, it can be a tapered inclined surface, a tapered curved surface, or a tapered zigzag shape, and the shape can be a tapered stepped structure, which, furthermore, includes at least two horizontal step surfaces along the extrusion direction and at least two vertical step surfaces connected with the horizontal step surfaces along the direction perpendicular to the extrusion direction. The number of the step surfaces has an influence on the thickness uniformity of the final extruded electrode sheet. When the step surface number is large, the material in the transition cavity 61 will have more aggregation force, become smoother, and have better thickness uniformity. Specifically, the stepped structure of the transition cavity 61 includes three horizontal step surfaces and three vertical step surfaces connected with the horizontal step surfaces. The last vertical step surface along the direction perpendicular to the extrusion direction is joined to the molding cavity 62 through an inclined surface.

The molding cavity 62 can be designed into different cross section shapes according to the requirements, so as to obtain special-shaped electrode sheets with different cross section shapes. The special-shaped electrode sheets have lower powder drop rate and more uniform inner stress than those obtained by conventional stamping molding or roller pressing molding methods. The cross section shape and cross section size of the electrode sheet can be freely adjusted only by changing the extrusion head 1. The electrode sheet is effectively ensured to have uniform shrinkage ratio during the drying process, so that the unfavorable situation of the electrode sheet dropping powder or even breaking will not occur due to the stress concentration. Optionally, the molding cavity 62 is a flat channel, and specifically, a cross section of the molding cavity is in a rectangular, wavy, arc-shaped, continuous concave and convex rampart shape or other special shapes. It should be noted that the cross section shape of the molding cavity 62 is not specifically limited in the present application, and the molding cavities 62 with different cross sections can be designed according to the molding requirements of the electrode sheet by those skilled in the art.

The extrusion head housing 1 is divided into a tapered section and a straight section which are joined in sequence along the extrusion direction, a small end surface of the tapered section is joined to the straight section, the tapered section is internally provided with the transition cavity 61 along the extrusion direction, and the transition cavity 61 with a gradually reduced diameter can further improve the thickness uniformity of the electrode sheet and reduce the powder drop rate of the electrode sheet, and has a certain shaping effect on the extruded electrode sheet; the straight section is internally provided with the molding cavity 62 along the extrusion direction. The cross section shape and cross section size of the extruded electrode sheet can be freely adjusted through matching different extrusion head 1 with different cross section shapes, thus satisfying the electrode sheet shape requirements of different special-shaped batteries. After drying, with specific cutting dies and by adjusting the size of the molding cavity 62 of the extrusion head 1, the special battery electrode sheets of different models can be prepared, which is suitable for most special-shaped electrode sheets and shows excellent thickness uniformity.

A large end surface of the tapered section is provided with a flange, and an outer edge of the flange is circumferentially provided with at least two threaded holes 5, and specifically, the outer edge of the flange plate is circumferentially provided with four threaded holes 5 at equal intervals. Optionally, the threaded holes 5 are countersunk threaded holes.

In another embodiment, the present application provides a molding device for an electrode sheet, which is a screw extruder. As shown in FIG. 1, the molding device includes an extrusion device housing 2 and a screw 4 coaxially arranged inside the extrusion device housing 2, in which an end of the extrusion device housing 2 is detachably connected with the extrusion head 1 provided by an embodiment. An end of the extrusion device housing 2 away from the extrusion head 1 is provided with a feeding bin 3, and an electrode sheet mixture is fed into the extrusion device housing 2 through the feeding bin 3, mixed and conveyed to the extrusion head 1 by the screw 4, and subjected to extrusion molding by the extrusion head 1. An end of the screw 4 close to the feeding bin 3 is connected with a driving motor in a drive transmission way, and the driving motor is used for driving the screw 4 to rotate. The extrusion device housing 2 is detachably connected with the extrusion head 1 through a flange. The molding device provided by the present application is mainly suitable for the molding process of the electrode sheet. The existing stamping press and roller press are replaced by the screw extruder, and the electrode sheet mixture is subjected to extrusion molding by the screw. When the electrode sheet mixture is extruded by the screw 4, it is kneaded thoroughly, and the active material, binder and solvent can be further mixed uniformly. The extruded electrode sheet keeps a relatively complete internal structure, showing a relatively high electrical conductivity. At the same time, the electrode sheet has excellent liquid absorption capacity, and it can significantly reduce the discharge capacity difference at different discharge postures (standing up, standing upside down) on the basis of keeping a good discharge capacity.

In another embodiment, the present application provides a molding method for an electrode sheet, which adopts the molding device to perform extrusion molding on an electrode sheet mixture. The molding method includes the steps:

the electrode sheet mixture is fed into the extrusion device housing through the feeding bin, mixed uniformly and conveyed to the extrusion head by the screw, and subjected to extrusion molding by the extrusion head, in which a extrusion frequency is 30-50 Hz, and a extrusion temperature is 30-60° C.

The electrode sheet formed by this molding method requires no conductive substrate for supporting, but it can keep certain flexibility and strength.

In another embodiment, the present application provides a preparation method for an electrode sheet, which includes the steps:

an active material, a binder and a solvent are subjected to mixing, molding, drying and blanking to obtain the electrode sheet, in which the molding is performed according to the molding method.

Compared with other electrode sheet preparation methods, the production efficiency of the preparation method provided by the present application is obviously improved. In the process of battery assembly, the carbon sheet can be automatically picked up and assembled by the equipment, and no fine powder will fall on separators during the current collector installation, reducing the micro-short-circuit risk caused by the fine powder of the electrode sheet. In the screw extruder, the electrode sheet mixture is kneaded thoroughly, and the active material, conductive agent with high specific surface area, binder and solvent can be further mixed uniformly. The extruded electrode sheet keeps a relatively complete internal structure, showing a relatively high electrical conductivity.

At the same time, the electrode sheet has excellent liquid absorption capacity, and it can significantly reduce the discharge capacity difference at different discharge postures (standing up, standing upside down) on the basis of keeping a good discharge capacity.

Example 1

This example provides a preparation method for a positive electrode sheet, which includes mixing, molding, drying and blanking in sequence, and specifically includes the following steps:

(1) mixing: acetylene black, a polytetrafluoroethylene emulsion (with a solid content of 50 wt %) and isopropanol were added into a mixing device according to a mass ratio of 1:0.1:3 for mixing and stirring, the mixing device had a stirring paddle rotating speed of 100 r/min, and after stirring for 10 min, an electrode sheet mixture was obtained;

(2) molding: the electrode sheet mixture was added into the feeding bin 3, fed into the extrusion device through the feeding bin 3, rotated and squeezed by the screw 4 to further mix the electrode sheet mixture thoroughly, then pushed and conveyed to the extrusion head 1, and subjected to extrusion molding by the extrusion head 1 at an extrusion frequency of 30 Hz and an extrusion temperature of 60° C., in which the extrusion head 1 is shown in FIG. 2, and a cross section of the molding cavity 62 is a flat rectangle, which can be used for extruding a flat and neat positive electrode sheet;

(3) drying: the molded positive electrode sheet was placed in a blast oven, and dried at 120° C. for 10 h to obtain the dried molded positive electrode sheet; and (4) blanking: the dried molded positive electrode sheet was placed in an automatic cutting and stamping device, and subjected to blanking to obtain a finished positive electrode sheet with a size of 20 mm×10 mm×1 mm.

The prepared positive electrode sheet was subjected to the tests below.

(1) Powder drop rate test: the 30 positive electrode sheets cut out were weighed, the mass was measured and recorded as $M_1$, the electrode sheets were placed in a friability tester, a running frequency and time were set for the equipment program, and after the equipment program was completed, the positive electrode sheets were taken out to observe whether the positive electrode sheets kept integrity. The fine powder was sieved off, the remaining positive electrode sheets were weighed, and the mass was measured and recorded as $M_2$, and the calculation equation of powder drop rate is $(M_1-M_2)/M_1\times100\%$.

(2) Discharge capacity test: with the same electrolyte composition, batteries composed of the same batch of positive electrode sheets were tested for the discharge capacity under four different discharge conditions, respectively, including standing up at room temperature, standing upside down at room temperature, standing up at 70° C. and standing upside down at 70° C. (it should be noted that the "standing up" here refers to that the battery discharges with the positive post going vertically up, and the "standing upside down" here refers to that the battery discharges with the positive post going vertically down). Specifically, the test includes the following steps.

The prepared positive electrode sheet was used as the positive electrode of a lithium/thionyl chloride battery, and the assembled batteries were tested for the discharge capacity difference at room temperature and high temperature. The assembly and operation methods of the lithium/thionyl chloride battery include the following steps: a cell was assembled with the positive electrode sheet prepared in this example used as the positive electrode, the metal lithium used as the negative electrode, the 1.4 mol/L thionyl chloride solution of lithium aluminum tetrachloride used as the electrolyte, and the separator; the batteries were tested for the discharge capacity when discharged with a constant resistance of 1620Ω and a cut-off voltage of 2.0 V under four conditions of standing up at room temperature, standing upside down at room temperature, standing up at 70° C. and standing upside down at 70° C., respectively. The test results are shown in Table 2.

(3) Thickness uniformity test: three different locations were selected randomly on the same positive electrode sheet, and accurately tested for the thickness by a thickness meter, the average value was calculated to be the thickness of the positive electrode sheet. The above thickness test was performed on 30 positive electrode sheets separately. A calculation equation of the thickness uniformity is $(L_{max}-L_{min})/L_{ave}$, wherein $L_{max}$ is the maximum thickness of the 30 positive electrode sheets, $L_{min}$ is the minimum thickness of the 30 positive electrode sheets, and $L_{ave}$ is the average thickness of the 30 positive electrode sheets, and the calculated thickness uniformity is 1.85%.

Example 2

This example provides a preparation method for a positive electrode sheet, which includes mixing, molding, drying and blanking in sequence, and specifically includes the following steps:

(1) mixing: a positive electrode material, a polytetrafluoroethylene emulsion (with a solid content of 55 wt %) and isopropanol were added into a mixing device according to a mass ratio of 1:0.2:4 for mixing and stirring, the positive electrode material included acetylene black and Ketjen black with a mass ratio of 9:1, the mixing device had a stirring paddle rotating speed of 200 r/min, and after stirring for 7 min, an electrode sheet mixture was obtained;

(2) molding: the electrode sheet mixture was added into the feeding bin 3, fed into the extrusion device through the feeding bin 3, rotated and squeezed by the screw 4 to further mix the electrode sheet mixture thoroughly, then pushed and conveyed to the extrusion head 1, and subjected to extrusion molding by the extrusion head 1 at an extrusion frequency of 40 Hz and an extrusion temperature of 40° C., in which the extrusion head 1 is shown in FIG. 2, and a cross section of the molding cavity 62 is a flat rectangle, which can be used for extruding a flat and neat positive electrode sheet;

(3) drying: the molded positive electrode sheet was placed in a blast oven, and dried at 140° C. for 7 h to obtain the dried molded positive electrode sheet; and (4) blanking: the dried molded positive electrode sheet was placed in an automatic cutting and stamping molding device, and subjected to blanking to obtain a finished positive electrode sheet with a size of 30 mm×12 mm×2 mm.

The prepared positive electrode sheet was tested for powder drop rate and thickness uniformity, and the battery composed of the positive electrode sheet was tested for the discharge capacity. The specific test methods are shown in Example 1, which will not be repeated in this example. The powder drop rate test result is shown in Table 1, and the discharge capacity test result is shown in Table 2, and the thickness uniformity of the positive electrode sheet is 1.67%.

Example 3

This example provides a preparation method for a positive electrode sheet, which includes mixing, molding, drying and blanking in sequence, and specifically includes the following steps:

(1) mixing: a positive electrode material, a polytetrafluoroethylene emulsion (with a solid content of 60 wt %) and isopropanol were added into a mixing device according to a mass ratio of 1:0.3:6 for mixing and stirring, the positive electrode material included acetylene black and carbon nanotubes with a mass ratio of 9:1, the mixing device had a stirring paddle rotating speed of 300 r/min, and after stirring for 5 min, an electrode sheet mixture was obtained;

(2) molding: the electrode sheet mixture was added into the feeding bin 3, fed into the extrusion device through the feeding bin 3, rotated and squeezed by the screw 4 to further mix the electrode sheet mixture thoroughly, then pushed and conveyed to the extrusion head 1, and subjected to extrusion molding by the extrusion head 1 at an extrusion frequency of 50 Hz and an extrusion temperature of 30° C., in which the extrusion head 1 is shown in FIG. 3, and a cross section of the molding cavity 62 is a continuous concave and convex rampart shape, which can be used for preparing a sector battery;

(3) drying: the molded positive electrode sheet was placed in a blast oven, and dried at 120-160° C. for 5-10 h to obtain the dried molded positive electrode sheet; and (4) blanking: the dried molded positive electrode sheet was placed in an automatic cutting and stamping molding device, and subjected to blanking to obtain a finished positive electrode sheet with a size of 50 mm×15 mm×4 mm.

The prepared positive electrode sheet was tested for powder drop rate and thickness uniformity, and the battery composed of the positive electrode sheet was tested for the discharge capacity. The specific test methods are shown in Example 1, which will not be repeated in this example. The powder drop rate test result is shown in Table 1, and the discharge capacity test result is shown in Table 2, and the thickness uniformity of the positive electrode sheet is 2.13%.

Comparative Example 1

This comparative example provides a preparation method for a positive electrode sheet, which differs from Example 1 in that stamping molding was used in step (2) to mold the electrode sheet mixture obtained from step (1), and specifically includes the following steps:

(1) mixing: acetylene black, a polytetrafluoroethylene emulsion (with a solid content of 50 wt %) and isopropanol were added into a mixing device according to a mass ratio of 1:0.1:3 for mixing and stirring, the mixing device had a stirring paddle rotating speed of 100 r/min, and after stirring for 10 min, an electrode sheet mixture was obtained;

(2) molding: the electrode sheet mixture was spread flat out in a die, subjected to a pressure of 15 Mpa at 30-60° C., and subjected to stamping molding to obtain a flat and neat positive electrode sheet;

(3) drying: the molded positive electrode sheet was placed in a blast oven, and dried at 120° C. for 10 h to obtain the dried molded positive electrode sheet; and (4) blanking: the dried molded positive electrode sheet was placed in an automatic cutting and stamping molding device, and subjected to blanking to obtain a finished positive electrode sheet with a size of 20 mm×10 mm×1 mm.

The prepared positive electrode sheet was tested for powder drop rate and thickness uniformity, and the battery composed of the positive electrode sheet was tested for the discharge capacity. The specific test methods are shown in Example 1, which will not be repeated in this example. The powder drop rate test result is shown in Table 1, and the discharge capacity test result is shown in Table 2, and the thickness uniformity of the positive electrode sheet is 3.54%.

Comparative Example 2

This comparative example provides a preparation method for a positive electrode sheet, which differs from Example 1 in that roller pressing molding was used in step (2) to mold the electrode sheet mixture obtained from step (1), and specifically includes the following steps:

(1) mixing: acetylene black, a polytetrafluoroethylene emulsion (with a solid content of 50 wt %) and isopropanol were added into a mixing device according to a mass ratio of 1:0.1:3 for mixing and stirring, the mixing device had a stirring paddle rotating speed of 100 r/min, and after stirring for 10 min, an electrode sheet mixture was obtained;

(2) molding: the electrode sheet mixture was immersed in an ethanol solution, and after absorbing the ethanol solution, the electrode sheet mixture was roller-pressed repeatedly into a positive electrode sheet with a certain thickness, in which the roller pressing had a roller temperature of 30-60° C., a linear pressure of 500 Kg/cm, and the electrode sheet mixture was subjected to roller pressing molding to obtain a flat and neat positive electrode sheet;

(3) drying: the molded positive electrode sheet was placed in a blast oven, and dried at 120° C. for 10 h to obtain the dried molded positive electrode sheet; and (4) blanking: the dried molded positive electrode sheet was placed in an automatic cutting and stamping molding device, and subjected to blanking to obtain a finished positive electrode sheet with a size of 20 mm×10 mm×1 mm.

The prepared positive electrode sheet was tested for powder drop rate and thickness uniformity, and the battery composed of the positive electrode sheet was tested for the discharge capacity. The specific test methods are shown in Example 1, which will not be repeated in this example. The powder drop rate test result is shown in Table 1, and the discharge capacity test result is shown in Table 2, and the thickness uniformity of the positive electrode sheet is 3.28%.

TABLE 1

| | If the electrode sheet was complete | Powder Drop Rate [%] |
|---|---|---|
| Example 1 | Yes | 0.27 |
| Example 2 | Yes | 0.33 |
| Example 3 | Yes | 0.29 |
| Comparative Example 1 | No | — |
| Comparative Example 2 | Yes | 0.64 |

TABLE 2

| | Example 1 | Example 2 | Example 3 | Comparative Example 1 | Comparative Example 2 |
|---|---|---|---|---|---|
| Discharge Capacity (standing up at room temperature) [Ah] | 0.725 | 0.693 | 0.706 | 0.693 | 0.734 |
| Discharge Capacity (standing upside down at room temperature) [Ah] | 0.714 | 0.675 | 0.693 | 0.664 | 0.655 |
| Discharge Capacity (standing up at 70° C.) [Ah] | 0.652 | 0.645 | 0.659 | 0.643 | 0.631 |
| Discharge Capacity (standing upside down at 70° C.) [Ah] | 0.643 | 0.624 | 0.635 | 0.583 | 0.598 |

The only difference between Comparative Example 1 and Example 1 is that Comparative Example 1 adopts a stamping molding process, while Example 1 adopts a screw extrusion molding process.

It can be seen from the powder drop rate data shown in Table 1 that the positive electrode sheet prepared in Comparative Example 1 drops more powder than that prepared in Example 1, and in fact, no complete positive electrode sheet can be prepared in Comparative Example 1, because the positive electrode particles are squeezed together solely through physical interaction after the stamping molding, and the positive electrode sheet has a low strength. There is a certain risk that the positive electrode sheet will break up when the positive electrode sheet is removed from the mold, or the material is moved, or the positive electrode sheet is assembled, or the current collector is installed, which is not conducive to the automatic assembly.

It can be seen from the discharge capacity data shown in Table 2 that there is little difference between the comparative example and the example in the condition of standing up at room temperature, but the discharge capacity of Example 1 is higher than that of the comparative example in the conditions of standing upside down at room temperature, standing up at high temperature and standing upside down at high temperature, the reason of which is that the screw extrusion molding method is adopted in Example 1, the electrode sheet mixture is kneaded thoroughly, the positive electrode material, binder and solvent can be further mixed uniformly, the extruded positive electrode sheet keeps a relatively complete internal structure, showing a relatively high electrical conductivity, and at the same time, the electrode sheet has excellent liquid absorption capacity, and it can significantly reduce the discharge capacity difference at different discharge postures (standing up, standing upside down) on the basis of keeping a good discharge capacity.

It can be seen from the thickness uniformity data that the thickness uniformity of the 30 positive electrode sheets obtained by cutting in Example 1 is obviously better than that of Comparative Example 1, because, if the positive electrode material is unevenly spread out in the mold before stamping, the molded positive electrode sheet will have uneven thickness, or even cannot be molded, but the screw extrusion molding method is adopted in Example 1, and there exists no problem of uneven spread.

The only difference between Comparative Example 2 and Example 1 is that Comparative Example 2 adopts a roller pressing molding process, while Example 1 adopts a screw extrusion molding process.

It can be seen from the powder drop rate data shown in Table 1 that the positive electrode sheet prepared in Comparative Example 2 drops more powder than that prepared in Example 1, because a large amount of organic solvent ethanol is used as the positive electrode molding agent in the roller pressing process, and the low flash point of ethanol poses certain safety risks in the operation and drying process. In addition, the positive electrode after absorbing ethanol is wet and soft, so the thickness uniformity of the positive electrode after roller pressing in a roller press is difficult to guarantee, and the rapid volatilization of ethanol easily leads to powder dropping and hollowing of the positive electrode.

It can be seen from the discharge capacity data shown in Table 2 that there is little difference between the comparative example and the example in the condition of standing up at room temperature, but the discharge capacity of Example 1 is slightly higher than that of the comparative example in the conditions of standing upside down at room temperature, standing up at high temperature and standing upside down at high temperature, the reason of which is that the screw extrusion molding method is adopted in Example 1, the electrode sheet mixture is kneaded thoroughly, the positive electrode material, binder and solvent can be further mixed uniformly, the extruded positive electrode sheet keeps a relatively complete internal structure, showing a relatively high electrical conductivity, and at the same time, the electrode sheet has excellent liquid absorption capacity, and it can significantly reduce the discharge capacity difference at different discharge postures (standing up, standing upside down) on the basis of keeping a good discharge capacity.

It can be seen from the thickness uniformity data that the thickness uniformity of the 30 positive electrode sheets obtained by cutting in Example 1 is obviously better than that of Comparative Example 2, because there are many roller pressing parameters that affect the thickness of positive electrode sheets and most of them are uncontrollable during the roller pressing, and the thickness uniformity of positive electrode sheets will be greatly affected by the roller pressing parameters which cannot be accurately controlled, while Example 1 adopts the screw extrusion molding method, and the parameters that need to be controlled are few and most of them are controllable, so the operation requirements of technicians are not low, and the thickness uniformity can be easily controlled.

The applicant has stated that although the embodiments of the present application are described above, the protection scope of the present application is not limited to the embodiments.

What is claimed is:

1. A molding device for an electrode sheet, which is a screw extruder, comprising an extrusion device housing and a screw coaxially arranged inside the extrusion device housing, wherein an end of the extrusion device housing is detachably connected with an extrusion head;
   the extrusion head comprises an extrusion head housing, wherein the extrusion head housing is internally provided with a through extrusion channel along extrusion direction;
   the through extrusion channel is divided into a transition cavity and a molding cavity which are joined and communicated in sequence along the extrusion direction, and an inner wall annular surface of the transition cavity has a gradually reduced diameter along the extrusion direction;
   an inner wall annular surface of the transition cavity has a stepped structure with a gradually reduced diameter;
   the stepped structure of the transition cavity comprises three horizontal step surfaces and three vertical step surfaces connected with the horizontal step surfaces.

2. The molding device according to claim 1, wherein an end of the extrusion device housing away from the extrusion head is provided with a feeding bin, and an electrode sheet mixture is fed into the extrusion device housing through the feeding bin, mixed and conveyed to the extrusion head by the screw, and subjected to extrusion molding by the extrusion head;
   an end of the screw near the feeding bin is connected with a driving motor in a drive transmission way, and the driving motor is used for driving the screw to rotate;
   the extrusion device housing is detachably connected with the extrusion head through a flange.

3. A molding method for an electrode sheet, which adopts the molding device according to claim 2 to perform extrusion molding on an electrode sheet mixture, comprising:
   feeding the electrode sheet mixture into the extrusion device housing through the feeding bin, mixing the mixture uniformly and conveying the mixture to the extrusion head by the screw, and subjecting the mixture to the extrusion molding by the extrusion head.

4. The molding method according to claim 3, wherein an extrusion frequency is 30-50 Hz; and
   an extrusion temperature is 30-60° C.

5. A preparation method for an electrode sheet, comprising:
   mixing an active material, a binder and a solvent into an electrode sheet mixture, and subjecting the electrode sheet mixture to molding, drying and blanking to obtain an electrode sheet, wherein the molding is realized by the molding method according to claim 3.

6. The preparation method according to claim 5, wherein the active material comprises one or a combination of at least two of conductive carbon black, acetylene black, Ketjen black, carbon nanotubes, manganese dioxide, carbon fluoride or $FeS_2$;
   the binder is a polytetrafluoroethylene emulsion wherein the polytetrafluoroethylene emulsion has a solid content of 50-60 wt %;
   the solvent is isopropanol or an aqueous solution of isopropanol;
   the active material, the binder and the solvent have a mass ratio of 1:(0.1-0.3):(3-6);
   the mixing is performed in a mixing device;
   the mixing has a stirring time of 5-10 min;
   the mixing device has a stirring paddle rotating speed of 100-300 r/min;
   the molding is performed in a molding device;

the molding device has an extrusion frequency of 30-50 Hz;

the molding device has an extrusion temperature of 30-60° C.;

the drying is performed in a blast oven;

the drying has a temperature of 120-160° C.;

the drying has a time of 5-10 h;

the blanking is performed in an automatic cutting and stamping device;

the electrode sheet after blanking has a thickness of 1-4 mm;

the electrode sheet after blanking has a width of 20-50 mm.

7. A molding device for an electrode sheet, which is a screw extruder, comprising an extrusion device housing and a screw coaxially arranged inside the extrusion device housing, wherein an end of the extrusion device housing is detachably connected with an extrusion head;

the extrusion head comprises an extrusion head housing, wherein the extrusion head housing is internally provided with a through extrusion channel along the extrusion direction;

the through extrusion channel is divided into a transition cavity and a molding cavity which are joined and communicated in sequence along the extrusion direction, and an inner wall annular surface of the transition cavity has a gradually reduced diameter along extrusion direction;

the extrusion head housing is divided into a tapered section and a straight section which are joined in sequence along the extrusion direction, a small end surface of the tapered section is joined to the straight section, the tapered section is internally provided with the transition cavity along the extrusion direction, and the straight section is internally provided with the molding cavity along the extrusion direction;

an inner wall annular surface of the transition cavity has a stepped structure with a gradually reduced diameter;

the stepped structure of the transition cavity comprises three horizontal step surfaces and three vertical step surfaces connected with the horizontal step surfaces.

8. A molding device for an electrode sheet, which is a screw extruder, comprising an extrusion device housing and a screw coaxially arranged inside the extrusion device housing, wherein an end of the extrusion device housing is detachably connected with an extrusion head;

the extrusion head comprises an extrusion head housing, wherein the extrusion head housing is internally provided with a through extrusion channel along extrusion direction;

the through extrusion channel is divided into a transition cavity and a molding cavity which are joined and communicated in sequence along the extrusion direction, and an inner wall annular surface of the transition cavity has a gradually reduced diameter along the extrusion direction;

an inner wall annular surface of the transition cavity has a stepped structure with a gradually reduced diameter;

the stepped structure of the transition cavity comprises three horizontal step surfaces and three vertical step surfaces connected with the horizontal step surfaces.

9. A molding device for an electrode sheet, which is a screw extruder, comprising an extrusion device housing and a screw coaxially arranged inside the extrusion device housing, wherein an end of the extrusion device housing is detachably connected with an extrusion head;

the extrusion head comprises an extrusion head housing, wherein the extrusion head housing is internally provided with a through extrusion channel along extrusion direction;

the through extrusion channel is divided into a transition cavity and a molding cavity which are joined and communicated in sequence along the extrusion direction, and an inner wall annular surface of the transition cavity has a gradually reduced diameter along the extrusion direction;

an inner wall annular surface of the transition cavity has a stepped structure with a gradually reduced diameter;

the stepped structure of the transition cavity comprises three horizontal step surfaces and three vertical step surfaces connected with the horizontal step surfaces;

the last vertical step surface along radial direction is joined to the molding cavity through an inclined surface.

\* \* \* \* \*